Patented June 6, 1950

2,510,081

UNITED STATES PATENT OFFICE 2,510,081

BIGUANIDE DERIVATIVES

Francis Henry Swinden Curd and Francis Leslie Rose, Blackley, Manchester, England, assignors to Imperial Chemical Industries Limited, a corporation of Great Britain No Drawing. Application June 10, 1947, Serial No. 753,800. In Great Britain May 10, 1944

9 Claims. (Cl. 260—565)

This invention relates to new compounds and more particularly it relates to compounds which are useful as antimalarial agents. The present application is a continuation-in-part of co-pending applications Serial Nos. 595,892, now U. S. Patent 2,467,371, and 701,094, now abandoned.

An object of the present invention is to provide new compounds having chemotherapeutic properties and being useful in the treatment of maleria. Other and further important objects of this invention will appear as the description proceeds.

These objects are attained by the present invention according to which there are provided new biguanide derivatives of the general formula:

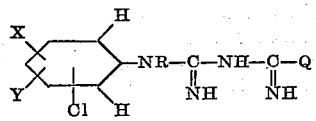

wherein X and Y represent atoms or radicals selected from the group consisting of hydrogen, chlorine and alkyl radicals of 1–3 carbon atoms, Q represents the radical of a nitrogenous base, for example of a monoalkyl- or a dialkyl-amine, provided that the number of carbon atoms contained in Q is more than one and fewer than 8, and R represents a hydrogen atom or a radical selected from the group consisting of alkyl radicals of 1–3 carbon atoms.

The new biguanide derivatives may be made for example by the method described in co-pending application No. 595,892, viz. by causing a substituted aryl-dicyandiamide of the formula

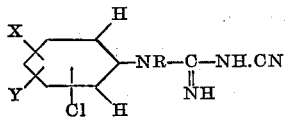

to react with a nitrogenous base of the formula QH, wherein X, Y, R and Q have the significance given above. The reaction may conveniently be brought about by heating the reagents together, if desired in presence of a solvent or diluent which for convenience may be an excess of nitrogenous base QH when this is liquid under the conditions of reaction employed.

The nitrogenous compound QH may be used either in the form of the free base or in the form of a salt for example the hydrochloride. Further the reaction may advantageously be carried out in the presence of a metal such as zinc or copper which may be used as such or in the form of an oxide, hydroxide or salt or as a pre-formed addition compound with the amine. There may be used for instance copper powder, hydrated copper oxide, copper sulphate or zinc chloride. In such cases the presence of the metal increases the speed of the reaction and improves the yield of biguanide. Also the biguanide can frequently be conveniently isolated directly from the reaction mixture in the form of a sparingly soluble complex with the metal salt.

The biguanide derivatives of the present invention may also be made by the process described in co-pending application Serial No. 701,094, viz. by causing a substituted dicyandiamide of the formula:

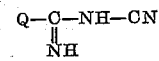

to react with an arylamine of the formula:

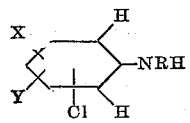

wherein X, Y, R and Q have the significance given above. This reaction may conveniently be brought about by heating the substituted dicyandiamide with a salt, for example the hydrochloride, of the arylamine in presence of a solvent, conveniently for example water or other hydroxylic solvent for example β-ethoxyethanol.

Alternatively again the biguanide derivatives of the present invention may be made by the processes described in co-pending applications Nos. 718,594, 720,096 and 723,450, all now abandoned.

The novel compounds of this invention are all characterised by a common structure, as expressed by the above general formula, and by substantially common physical and chemical characteristics. Outstanding among their properties is the pharmaceutical property of being excellent antimalarial agents. Our novel compounds thus constitute synthetic substitutes for quinine. While the degree of efficacy as an antimalarial agent will, of course, vary from one individual compound to the next, we have tested so large a number of members of the general class against avian malaria that it may safely be postulated that all the compounds of the class have antimalarial properties. Among the numerous compounds actually tested by us in avian malaria and found to be active the following substances may be named:

$N^1$-p-chlorophenyl-$N^5$:$N^5$-diethylbiguanide,

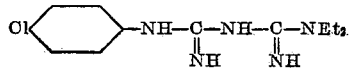

$N^1$ - p - chlorophenyl-$N^5$-methyl-$N^5$-isopropylbiguanide,

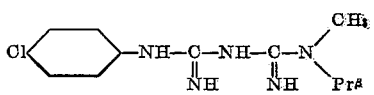

$N^1$-p-chlorophenyl-$N^5$-ethylbiguanide,
$N^1$-p-chlorophenyl-$N^5$-n-amylbiguanide,
$N^1$-p-chlorophenyl-$N^5$-n-propylbiguanide,
$N^1$-p-chlorophenyl-$N^5$-isopropylbiguanide,
$N^1$-p-chlorophenyl-$N^5$-n-butylbiguanide,
$N^1$-p-chlorophenyl-$N^5$-isobutylbiguanide,
$N^1$-p-chlorophenyl-$N^5$-tert-butylbiguanide,
$N^1$ - p - chlorophenyl-$N^5$-methyl-$N^5$-n-propylbiguanide,
$N^1$ - p-chlorophenyl-$N^1$-methyl-$N^5$:$N^5$-diethylbiguanide,

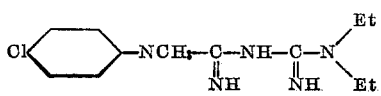

$N^1$ - p - chlorophenyl-$N^1$-methyl-$N^5$-isopropylbiguanide,
$N^1$-m-chlorophenyl-$N^5$-isopropylbiguanide,
$N^1$ - m - chlorophenyl-$N^5$-methyl-$N^5$-isopropylbiguanide,
$N^1$-m-chlorophenyl-$N^5$:$N^5$-diethylbiguanide,
$N^1$-m-chlorophenyl-$N^5$-n-propylbiguanide,
$N^1$-m-chlorophenyl-$N^5$-ethylbiguanide,
$N^1$ - 3 - chloro - 4-methylphenyl-$N^5$-isopropylbiguanide,
$N^1$ - 3 - methyl - 4-chlorophenyl-$N^5$-isopropylbiguanide,
$N^1$-3:4-dichlorophenyl-$N^5$-isopropylbiguanide,

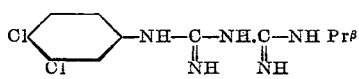

$N^1$-3:5-dichlorophenyl-$N^5$-isopropylbiguanide,
$N^1$-3:4:5-trichlorophenyl-$N^5$-isopropylbiguanide,
$N^1$-3:4:5-trichlorophenyl-$N^5$-n-propylbiguanide,
$N^1$ - 3:4:5 - trichlorophenyl - $N^5$ - methyl-$N^5$-isopropylbiguanide.

The new compounds are strong bases; they form stable salts with organic and inorganic acids which in many cases are freely soluble in water. The salts may be made by treating the biguanides in water with the appropriate acid and then removing the water, but they are more conveniently obtained in a dry form by mixing the components together in an organic solvent such as for example acetone, or an alcohol, in which the salt is sparingly soluble. For use chemotherapeutically it is frequently an advantage to apply the new compounds in the form of their salts, especially those salts which are water-soluble. For this purpose there may be used for example the acetates, propionates, butyrates, crotonates, formates, malonates, succinates, glycollates, tartrates, citrates, hydrochlorides, nitrates, sulphates, lactates, methanesulphonates, methylene-disalicylates or the methylene-bis-β-hydroxy-naphthoates, or the glycine salts, but it will be understood that many other salts may equally be used, it being understood that for use in the treatment of human malaria it is not desirable to use the salt of an acid which, of itself, possesses toxic properties.

The following examples illustrate but do not limit the invention. The parts are by weight.

*Example 1*

19.5 parts of p-chlorophenyl dicyandiamide, 20 parts of diethylamine, 140 parts of ethyl alcohol, and a solution of 12.5 parts of copper sulphate pentahydrate in 60 parts of water, are mixed and the mixture is stirred and heated under reflux for 2 hours. The resultant suspension is cooled, diluted with 300 parts of water and filtered. The light-brown solid residue which is mainly the copper complex of $N\alpha$-p-chlorophenyl-$N\omega$-diethylbiguanide, is dissolved in a mixture of 100 parts of 36% hydrochloric acid and 600 parts of water. A solution of 40 parts of sodium sulphide nonahydrate in 100 parts of water is slowly added. Copper sulphide is precipitated and is filtered off. The clear filtrate is made strongly alkaline with caustic soda. The precipitate of the crude biguanide so formed is collected, dried and crystallised from petroleum ether. It forms colourless needles which melt at 133°–134° C. uncorr.

In a similar manner, there may be obtained the following biguanides having the melting points indicated.

*Ex. 2.*—$N\alpha$- p -chlorophenyl - $N\omega$ - dimethylbiguanide; colourless plates from toluene, M. P. 169° C. uncorr.

*Ex. 3.*—$N\alpha$-p-chlorophenyl-$N\omega$-methyl-$N\omega$-isopropylbiguanide; colourless needles from toluene, M. P. 174°–175° C. uncorr.

*Ex. 4.*—$N\alpha$-p-chlorophenyl-$N\omega$-ethylbiguanide; colourless prisms from toluene, M. P. 99°–101° C.

*Ex. 5.*—$N\alpha$-p-chlorophenyl-$N\omega$-amylbiguanide; colourless needles from water, M. P. 229° C.

*Ex. 6.*—$N\alpha$-p-chlorophenyl - $N\omega$ - n - propylbiguanide; colourless crystals from ethanol, M. P. 58.5°–6° C.

*Ex. 7.*—$N\alpha$-p-chlorophenyl - $N\omega$ - isopropylbiguanide; colourless crystals from aqueous ethanol, M. P. 130°–131° C.; the acetate forms colourless crystals from acetone, M. P. 188°–189° C.

*Ex. 8.*—$N\alpha$-p-chlorophenyl-$N\omega$-n-butylbiguanide acetate; colourless prisms from acetone, M. P. 158° C.

*Ex. 9.*—$N\alpha$-p-chlorophenyl-$N\omega$-isobutylbiguanide hydrochloride; colourless plates from acetone, M. P. 232° C.

*Ex. 10.*—$N\alpha$-p-chlorophenyl - $N\omega$ - tert-butylbiguanide hydrochloride; colourless crystals from acetone, M. P. 232°–234° C.

*Ex. 11.*—$N\alpha$-p-chlorophenyl - $N\omega$ - methyl - $N\omega$-n-propylbiguanide; colourless plates from toluene, M. P. 125°–126° C.

*Ex. 12.*—$N\alpha$-p-chlorophenyl-$N\alpha$-methyl-$N\omega$-diethylbiguanide; the hydrochloride crystallises from water in colourless prisms, M. P. 182°–184° C.

*Example 13*

A mixture of 12.6 parts of $N^3$-isopropyldicyandiamide and 25 parts of m-chloroaniline hydrochloride dissolved in 250 parts of water is boiled under reflux for 3 hours. The solution is cooled and crystallisation is induced by scratching with a glass rod. The crystals are filtered off, washed with a little cold water and then dried. They are then suspended in 50 parts of acetone, stirred for 10 minutes, filtered and washed with a little acetone. Recrystallisation from water then gives pure $N^1$-m-chlorophenyl- $N^5$ -isopropylbiguanide hydrochloride which melts at 232° C.

Example 14

A mixture of 12.6 parts of $N^3$-isopropyldicyandiamide, 19 parts of N-methyl-p-chloroaniline hydrochloride and 150 parts of water is heated under reflux for 3 hours. It is then cooled and the precipitated crystals are filtered off, and washed with a little water. The dried material is slurried with a little ethyl acetate, filtered, washed with ethyl acetate and dried. It is then redissolved in hot water, the solution is clarified by refluxing for 10 minutes with decolourising carbon, then filtered and allowed to cool and crystallise. There is thus obtained $N^1$-p-chlorophenyl-$N^1$-methyl-$N^5$-isopropylbiguanide hydrochloride, which melts at 235–6° C.

Example 15

A mixture of 12.6 parts of $N^3$-isopropyldicyandiamide, 22 parts of 3:4-dichloroaniline hydrochloride and 100 parts of β-ethoxyethanol is heated under reflux for 3 hours. It is then allowed to cool and the crystals which separate are filtered off and washed with a little β-ethoxyethanol. A further crop of crystals is obtained by the addition of 3 volumes of ethyl acetate to the mother liquor. The total material thus obtained is dissolved in hot alcohol, the solution is clarified by refluxing for 15 minutes with decolourising carbon, then filtered and allowed to cool and crystallise. There is thus obtained $N^1$-3:4-dichlorophenyl-$N^5$-isopropylbiguanide hydrochloride, which melts at 244–5° C.

Example 16

A mixture of 12.6 parts of $N^3$-isopropyldicyandiamide, 25 parts of 3:5-dichloroaniline hydrochloride and 100 parts of β-ethoxyethanol is heated under reflux for 3 hours. It is then cooled, 200 parts of ethyl acetate are added and the mixture is allowed to stand for 1 hour. The crystals which separate are filtered off and washed with a mixture of β-ethoxyethanol and ethyl acetate. They are then dissolved in hot water, the solution is clarified by refluxing for 10 minutes with decolourising carbon, then filtered and allowed to cool. The crystals which separate are filtered off, washed and dried. There is thus obtained $N^1$-(3:5-dichlorophenyl)-$N^5$-isopropylbiguanide hydrochloride, which melts at 239–240° C.

Example 17

A mixture of 12.6 parts of $N^3$-isopropyldicyandiamide, 25.6 parts of 3:4:5-trichloroaniline hydrochloride and 100 parts of water is heated to boiling under reflux. Sufficient β-ethoxyethanol to bring about complete solution is added and the mixture is boiled for 3 hours. It is then allowed to cool and a crop of crystals separates. This is filtered off and washed with aqueous β-ethoxyethanol. It is then dissolved in hot alcohol, the solution is clarified by refluxing for 15 minutes with decolourising carbon, then filtered and allowed to cool. The crystals which separate are filtered off, washed and dried. There is thus obtained $N^1$-(3:4:5-trichlorophenyl)-$N^5$-isopropylbiguanide hydrochloride, which melts at 254–5° C.

Example 18

A mixture of 14 parts of $N^3$-methyl-$N^3$-isopropyldicyandiamide, 18 parts of m-chloroaniline hydrochloride and 150 parts of water is heated under reflux for 90 minutes. It is then allowed to cool and the crystals which are deposited are filtered off, washed with water and dried. These are slurried with a little ethyl acetate, then filtered off and washed with ethyl acetate. They are then dissolved in hot water, the solution is clarified by refluxing for 10 minutes with decolourising carbon, then filtered and allowed to cool. The crystals which separate are filtered off, washed and dried. There is thus obtained $N^1$-m-chlorophenyl-$N^5$-methyl-$N^5$-isopropylbiguanide hydrochloride, which melts at 234° C.

Example 19

A mixture of 4.0 parts of $N^3$:$N^3$-diethyldicyandiamide, 4.7 parts of m-chloroaniline hydrochloride and 10 parts of β-ethoxyethanol is boiled under reflux for 30 minutes. The mixture is cooled, diluted with ethyl acetate and the crystalline solid is filtered off and washed with ethyl acetate. It is then dried and purified by crystallisation from water giving $N^1$-m-chlorophenyl-$N^5$-diethylbiguanide hydrochloride, M. P. 226–227° C.

Example 20

To a solution of 8.9 parts of 3-chloro-4-methylaniline hydrochloride in 50 parts of β-ethoxyethanol maintained at the boil under reflux condenser there is added 6.3 parts of $N^3$-isopropyldicyandiamide. After a few minutes the mixture is cooled, diluted with 100 parts of ethyl acetate and the crystalline precipitate is filtered off, washed with ethyl acetate and dried at 65° C. It is then recrystallised from water and $N^1$-(3-chloro-4-methylphenyl)-$N^5$-isopropylbiguanide hydrochloride is obtained. It has M. P. 256° C.

Example 21

In a similar manner using equivalent amounts of appropriate intermediates there are made $N^1$-4-chloro-3-methylphenyl-$N^5$-isopropylbiguanide hydrochloride, M. P. 243–245° C., $N^1$-3:4:5-trichlorophenyl-$N^5$-n-propylbiguanide hydrochloride, M. P. 228–229° C., and $N^1$-3:4:5-trichlorophenyl-$N^5$-methyl-$N^5$-isopropylbiguanide hydrochloride, M. P. 234–235° C.

While it will be understood that medical utility in the treatment of human malaria may formally be asserted only after extensive clinical trials, it has been found that in this class of compounds the efficacy of a substance in avian malaria, particularly in *Plasmodium gallinaceum* infection of chicks, is a good indication of its utility in the treatment of human malaria. Moreover, efficacy against the exo-erythrocytic forms of avian malaria organisms in this class of compounds is generally indicative of utility as a casual prophylactic in human malaria. Utility as a casual prophylactic is a very desirable feature of an antimalarial agent and this feature is not possessed by quinine. Quinine is merely curative and, to a degree, clinically prophylactic, these properties being generally indicated by efficacy against the erythrocytic forms in avian malaria. Thus, the compounds of the present invention possess generally a very important advantage in comparison with quinine. Yet a further advantage presented especially by some of the compounds of the present invention is that we have found that they are effective at a dosage which is much smaller in relation to the toxic dose than is the case with many preexisting antimalarial agents.

Moreover, as indicated above, the compounds of the present invention are readily made by a number of relatively simple chemical processes and from cheap, or potentially cheap, starting materials. In this they show a clear advantage over many already-known synthetic antimalarial agents, notably over Mepacrine which is 2-chloro- 5(ω-diethylamino-α-methyl-butylamino) 7-methoxyacridine. Also, being colourless, they do not possess undesirable property of staining the skin of the patient.

We claim:
1. $N^1$-m-chlorophenyl- $N^5$ -isopropylbiguanide.
2. $N^1$-3:4 - dichlorophenyl-$N^5$-isopropylbiguanide.
3. $N^1$-3:4:5 - trichlorophenyl - $N^5$ - isopropylbiguanide.
4. A compound selected from the group consisting of the free base form and salts of the biguanides of the general formula

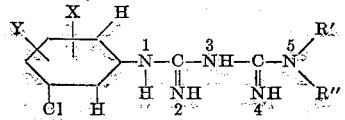

wherein X and Y are radicals from the group consisting of hydrogen, chlorine and 1 to 3 carbon atom alkyl; R' is a lower alkyl radical; R'' is a radical from the group consisting of lower alkyl and hydrogen; the sum of carbon atoms in the radicals R' plus R'' being between 1 and 8 inclusive.

5. A compound of the formula:

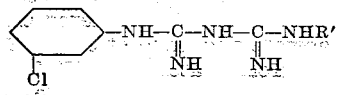

wherein R' is a lower alkyl radical.

6. A compound of the formula:

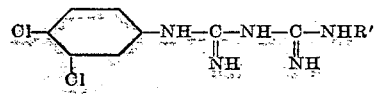

wherein R' is a lower alkyl radical.

7. A compound of the formula:

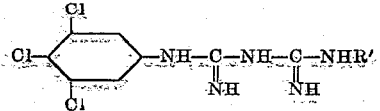

wherein R' is a lower alkyl radical.

8. $N'$-3:5-dichlorophenyl-$N^5$-isopropyl biguanide.
9. $N'$-3-chloro-4-methylphenyl - $N^5$ - isopropyl biguanide.

FRANCIS HENRY SWINDEN CURD.
FRANCIS LESLIE ROSE.

REFERENCES CITED

The following references are of record in the file of this patent:

Curd et al., "Annals Tropical Med. & Parasitol.," vol. 39, Dec. 31, 1945, pages 208 and 212
Spinks et al., "Annals Tropical Med. & Parasitol.," vol. 39, Dec. 31, 1945, page 220.